US009938912B2

(12) United States Patent
Hagari

(10) Patent No.: US 9,938,912 B2
(45) Date of Patent: Apr. 10, 2018

(54) CONTROL DEVICE FOR INTERNAL COMBUSTION ENGINE

(71) Applicant: Mitsubishi Electric Corporation, Tokyo (JP)

(72) Inventor: Hideki Hagari, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 422 days.

(21) Appl. No.: 14/820,752

(22) Filed: Aug. 7, 2015

(65) Prior Publication Data

US 2016/0222894 A1   Aug. 4, 2016

(30) Foreign Application Priority Data

Feb. 3, 2015   (JP) ................................. 2015-019294

(51) Int. Cl.
| | |
|---|---|
| *F02B 33/00* | (2006.01) |
| *F02D 45/00* | (2006.01) |
| *F02D 41/02* | (2006.01) |
| *F02D 23/00* | (2006.01) |
| *F02B 39/04* | (2006.01) |

(Continued)

(52) U.S. Cl.
CPC ........... *F02D 41/0007* (2013.01); *F02D 9/02* (2013.01); *F02D 11/105* (2013.01); *F02D 41/2464* (2013.01); *F02B 39/04* (2013.01); *F02D 41/2409* (2013.01); *F02D 2200/0406* (2013.01); *F02D 2200/0411* (2013.01); *F02D 2200/101* (2013.01); *F02D 2250/18* (2013.01); *F02M 35/10163* (2013.01); *Y02T 10/144* (2013.01)

(58) Field of Classification Search
CPC ............... F02D 41/0007; F02D 11/105; F02D 2200/18; F02D 2200/411; Y02T 10/144
See application file for complete search history.

(56) References Cited

U.S. PATENT DOCUMENTS 6,273,076 B1 * 8/2001 Beck .................... F02B 29/0412
123/562
8,762,029 B2 * 6/2014 Takahashi ............... F02D 11/10
123/399

(Continued)

FOREIGN PATENT DOCUMENTS

| JP | 04-325717 A | 11/1992 |
|---|---|---|
| JP | 3366399 B2 | 1/2003 |
| JP | 5420013 B | 2/2014 |

*Primary Examiner* — Hieu T Vo
*Assistant Examiner* — Arnold Castro
(74) *Attorney, Agent, or Firm* — Sughrue Mion, PLLC; Richard C. Turner

(57) ABSTRACT

A control device for an internal combustion engine is configured to: calculate a target intake air amount and a target charging efficiency based on a target torque; control an opening degree of a throttle valve (6) based on the target intake air amount; calculate a target supercharger downstream pressure based on the target charging efficiency; detect a pressure on an upstream side of a supercharger; calculate a target compressor driving force based on the target intake air amount, the target supercharger downstream pressure, and the supercharger upstream pressure; and calculate a target bypass valve opening degree based on the target compressor driving force, to thereby control an opening degree of a bypass valve (12) provided to a bypass passage for bypassing the supercharger.

15 Claims, 6 Drawing Sheets

(51) Int. Cl.
*F02D 41/00* (2006.01)
*F02D 9/02* (2006.01)
*F02D 11/10* (2006.01)
F02M 35/10 (2006.01)
F02D 41/24 (2006.01)

(56) References Cited

U.S. PATENT DOCUMENTS

| | | | | |
|---|---|---|---|---|
| 8,924,123 | B2* | 12/2014 | Kubota | F02B 33/36 |
| | | | | 701/99 |
| 9,115,643 | B2* | 8/2015 | Takahashi | F02D 23/00 |
| 2011/0144885 | A1* | 6/2011 | Ohtsuka | F02D 11/105 |
| | | | | 701/102 |
| 2013/0282256 | A1* | 10/2013 | Watanuki | F02D 23/02 |
| | | | | 701/102 |
| 2013/0282259 | A1* | 10/2013 | Takahashi | F02D 11/105 |
| | | | | 701/103 |
| 2015/0144114 | A1* | 5/2015 | Tanaka | F02D 23/005 |
| | | | | 123/564 |

* cited by examiner

RELATIONSHIP BETWEEN
Qa AND Pc AT PREDETERMINED
ENGINE ROTATIONAL SPEED

RELATIONSHIP BETWEEN
Qa AND Pc" AT PREDETERMINED
ENGINE ROTATIONAL SPEED

CONTROL DEVICE FOR INTERNAL COMBUSTION ENGINE

BACKGROUND OF THE INVENTION

1. Field of the Invention

The present invention relates to a control device for an internal combustion engine, and more particularly, to a control device for an internal combustion engine equipped with a mechanical supercharger including a compressor to be driven via a belt by an output shaft of the internal combustion engine.

2. Description of the Related Art

Hitherto, a control system for an internal combustion engine (hereinafter referred to as engine) equipped with a supercharger has been developed in order to increase an output of the engine. As an example of the supercharger, there have been known a turbo supercharger (hereinafter referred to as turbocharger, and also sometimes referred to as T/C) and a mechanical supercharger (hereinafter referred to as supercharger, and also sometimes referred to as S/C).

In a turbocharger, a turbine provided to an exhaust system of the engine is rotated at high speed by using energy of exhaust gas. With this, a compressor, which is provided to an intake system and is connected to the turbine, is driven.

Besides, in a supercharger, a compressor provided to the intake system of the engine is driven via a belt by using an output shaft of the engine.

In recent years, there have been developed an engine system having a plurality of turbo chargers disposed in series or in parallel and an engine system having both the turbocharger and the supercharger provided thereto. Further, there has been developed an electric charger for directly driving the compressor with an electric motor.

In the turbocharger, there is a possibility that excessive increase of a supercharging pressure at high rotation and high load operation could lead to a damage of the engine. Therefore, in general, an exhaust bypass passage is provided upstream of the turbine. Moreover, a part of the exhaust gas flowing through an exhaust passage is branched to a bypass passage by a waste gate valve provided to the exhaust bypass passage. In this way, the supercharging pressure is controlled to an appropriate level by adjusting an inflow amount of the exhaust gas into the turbine.

As a control method for the supercharging pressure by the waste gate valve, for example, there is known a control device for an internal combustion engine as described in Japanese Patent No. 5420013. According to Japanese Patent No. 5420013, first, a target intake air flow rate and a target charging efficiency are calculated based on an engine output target value. Then, a target throttle upstream pressure is calculated based on the target charging efficiency and a rotational speed. Further, a target compressor driving force to be required for driving a supercharger is calculated based on the target intake air flow rate and the target throttle upstream pressure. On this occasion, the exhaust gas flow rate is calculated based on an air-to-fuel ratio and the intake air flow rate, and characteristics of the exhaust gas flow rate and a compressor driving force only depend on a waste gate valve control value. A target waste gate valve control value is calculated by using this relationship from the exhaust gas flow rate and the target compressor driving force.

The control device for an internal combustion engine disclosed in Japanese Patent No. 5420013 is high in compatibility with the so-called torque-based control, which is a recent mainstream. Therefore, the control device for an internal combustion engine disclosed in Japanese Patent No. 5420013 has such excellent features that an acceleration response characteristic can be operated, an operation can be carried out at an optimal point of the fuel efficiency, and variation elements can be learned. It should be noted that the torque-based control is a control method involving setting an output shaft torque of the engine, which is a required value for a driving force by a driver or a vehicle, as an engine output target value, and determining an air amount, a fuel amount, and an ignition timing, which are main engine control amounts.

On the other hand, also in the supercharger, there is a possibility that excessive increase of a supercharging pressure at high rotation and high load operation could lead to a damage of the engine. Therefore, a bypass passage for bypassing the supercharger is provided. Then, a bypass valve provided to the bypass passage is used so as to return the air in a supercharger downstream to a supercharger upstream. As a result, the supercharging pressure is controlled to an appropriate level.

As another method in the supercharger, there is known a method of suppressing the supercharging pressure to an appropriate level by disconnecting the supercharger from the output shaft of the engine by means of an electromagnetic clutch.

As a control method for the supercharging pressure by using the bypass valve, for example, in Japanese Patent Application Laid-open No. H 4-325717 A1, there is disclosed an intake air control device for a supercharged internal combustion engine for calculating a target duty ratio of the bypass valve and a target intake air amount based on an output signal of a load sensor which generates an output voltage corresponding to a depressed amount of an accelerator pedal and the like, and applying feedback control to the target duty ratio by using the target intake air amount corrected depending on an environment and an intake air amount detected by an airflow meter. Moreover, in Japanese Patent No. 3366399, there is disclosed a supercharging pressure control device for a supercharged engine for calculating a bypass air amount for attaining a target supercharging pressure depending on an engine operation state, and determining a control amount for the bypass valve based on the difference between a downstream side pressure and an upstream side pressure of a supercharger.

However, in the control device disclosed in Japanese Patent No. 5420013, the control method for the supercharging pressure is carried out by means of the waste gate valve, and hence cannot be applied as the control method for the supercharging pressure by means of the bypass valve.

In Japanese Patent Application Laid-open No. H 4-325717 and Japanese Patent No. 3366399, there are disclosed the methods for the supercharging pressure by means of the bypass valve. However, in the control device disclosed in Japanese Patent Application Laid-open No. H 4-325717, it can be considered that the control system is constructed while assuming a one-to-one relationship between the target duty ratio and the target intake air amount corrected depending on the environment. In the control device according to Japanese Patent Application Laid-open No. H 4-325717, the relationship with the throttle opening degree or the throttle downstream pressure is not taken into consideration. Therefore, for example, when the throttle opening degree or the throttle downstream pressure changes due to variations in environmental conditions and the throttle valve and the like, and the relationship between the target duty ratio and the target intake air amount corrected depending on the environment thus no longer holds true, there is a first problem of degradation of controllability.

Further, the control device according to the Japanese Patent Application Laid-open No. H 4-325717 has a second problem in that a torque requirement from sources other than the driver, such as a torque down requirement from transmission control, traction control, or the like cannot be dealt with. It is conceivable that those problems are solved by the control device disclosed in Japanese Patent No. 3366399. This is because, regarding the first problem, the control amount for the bypass valve is determined while accounting for the throttle opening degree and the throttle downstream pressure, and regarding the second problem, the control amount for the bypass valve is determined by using the usual target supercharging pressure as well as a target supercharging pressure for the traction control.

However, in the control device disclosed in Japanese Patent No. 3366399, it is considered that the control system is constructed based on the relationship among a flow rate (ABV passage flow rate) of air passing through the air bypass valve (ABV), a differential pressure before and after the ABV, and an ABV opening degree. However, in recent years, the supercharger is constructed integrally with the bypass valve, and the bypass valve is thus close to the supercharger. Therefore, air in the neighborhood of the bypass valve is disturbed depending on the rotational speed (∝ engine rotational speed) of the supercharger and the passage flow rate. As a result, an effective opening area of the ABV changes, and as a result, the relationship among the ABV passage flow rate, the differential pressure between before and after the ABV, and the ABV opening degree greatly change depending on the operation state. Therefore, in order to calculate or measure the relationship among the ABV passage flow rate, the differential pressure between before and after the ABV, and the ABV opening degree, and so as to precisely simulate the relationship thereof, maps more in number than those illustrated in FIG. 5 of Japanese Patent No. 3366399 may be necessary. As a result, there is such a problem that man-hours for data measurement and adaptation increase. Moreover, in Japanese Patent No. 3366399, learning of an S/C discharge amount for correcting the variations is described. However, a variation element may exist also in the bypass valve in addition to the supercharger, and hence there is also such a problem that the correction is not sufficiently carried out only by the learning of the S/C discharge amount.

SUMMARY OF THE INVENTION

The present invention has been made in view of the above-mentioned problems, and therefore has an object to provide a control device for an internal combustion engine, which enables simple manipulation of an acceleration response characteristic while suppressing man-hours for data measurement and adaptation.

According to one embodiment of the present invention, there is provided a control device for an internal combustion engine, including: a throttle valve provided to an intake passage of an internal combustion engine; a supercharger provided to a downstream side of the throttle valve provided to the intake passage, the supercharger including a compressor to be driven by an output shaft of the internal combustion engine; a bypass valve provided to a bypass passage, the bypass passage being connected to the intake passage to bypass the supercharger; a bypass valve drive unit for operating a bypass valve opening degree, which is an opening degree of the bypass valve, to thereby change a flow passage cross-sectional area of the bypass passage; a target intake air amount calculation unit for calculating, based on a target torque that is an output target value of the internal combustion engine, a target intake air amount to be a target value of an intake air amount taken into the internal combustion engine, and a target charging efficiency to be a target value of a charging efficiency of the internal combustion engine; a target throttle opening degree calculation unit for calculating a target opening degree of the throttle valve based on the target intake air amount; a throttle valve drive unit for operating, based on the target opening degree of the throttle valve, the opening degree of the throttle valve, to thereby adjust an intake air amount to be an air amount taken into the internal combustion engine; a target supercharger downstream pressure calculation unit for calculating, based on the target charging efficiency, a target supercharger downstream pressure to be a target value of a pressure on a downstream side of the supercharger; a supercharger upstream pressure detection unit for detecting a supercharger upstream pressure, which is a pressure on an upstream side of the supercharger; a target compressor driving force calculation unit for calculating, based on the target intake air amount, the target supercharger downstream pressure, and the supercharger upstream pressure, a target compressor driving force; and a target bypass valve opening degree calculation unit for calculating, based on the target compressor driving force, a target bypass valve opening degree to be a target value of the bypass valve opening degree.

The control device for an internal combustion engine according to the one embodiment of the present invention is configured to: calculate the target intake air amount and the target charging efficiency based on the target torque; control the opening degree of the throttle valve based on the target intake air amount; calculate the target supercharger downstream pressure based on the target charging efficiency; detect the pressure on the upstream side of the supercharger; calculate the target compressor driving force based on the target intake air amount, the target supercharger downstream pressure, and the supercharger upstream pressure; and calculate the target bypass valve opening degree based on the target compressor driving force, to thereby control the opening degree of the bypass valve provided to the bypass passage for bypassing the supercharger. As a result, while the man-hours for the data measurement and the adaptation are suppressed, the torque requirement from the driver or other control devices can be realized, and the manipulation of the acceleration response characteristic can be easily realized.

DETAILED DESCRIPTION OF THE PREFERRED EMBODIMENTS

Figure 1:
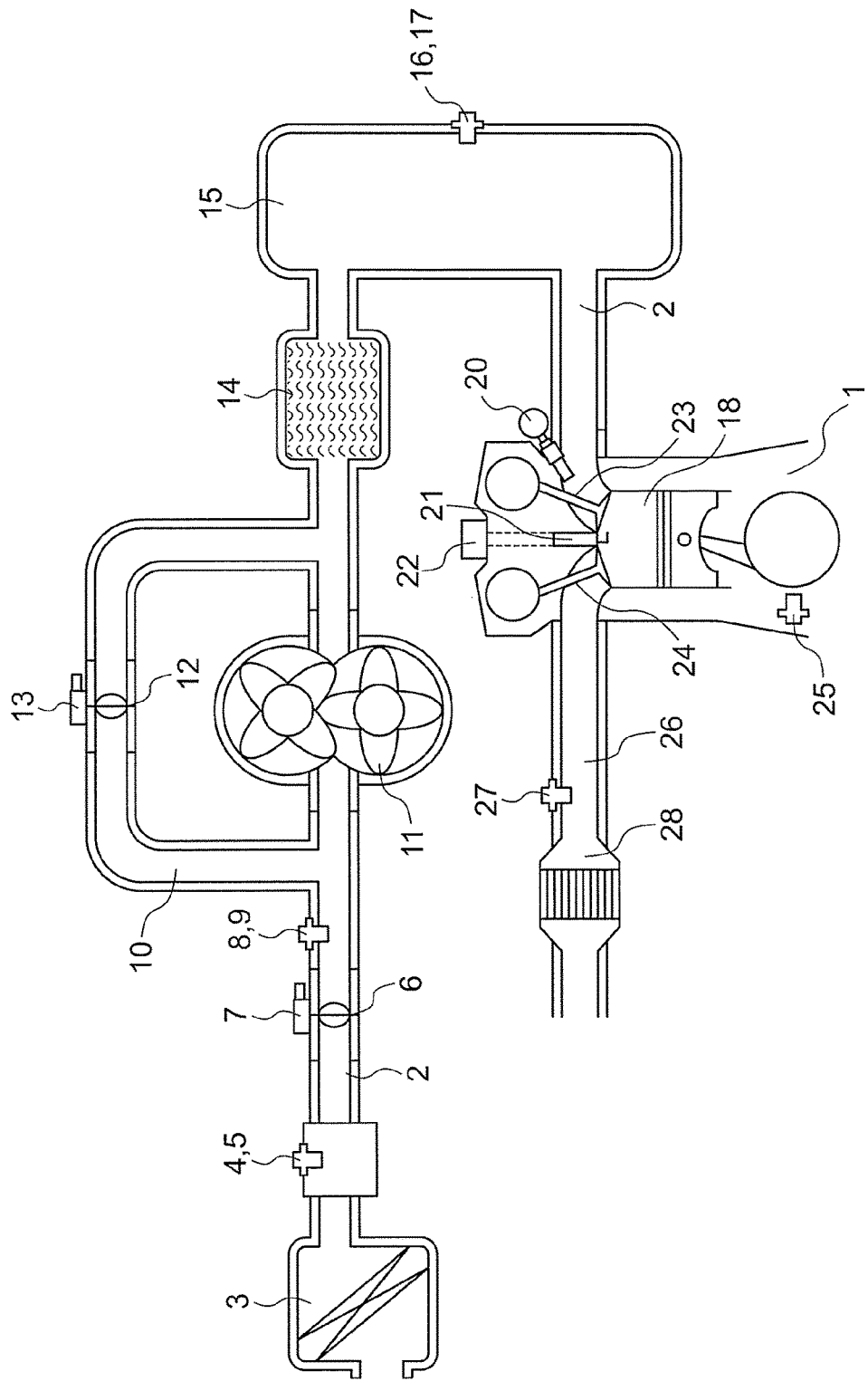
FIG. 1 is a configuration diagram for illustrating intake/exhaust systems of an engine according to an embodiment of the present invention.

Now, an embodiment for carrying out the present invention is described referring to the drawings.

First Embodiment

FIG. 1 is a configuration diagram for illustrating an internal combustion engine (hereinafter referred to as engine 1) and intake/exhaust systems thereof, to which a control device for an internal combustion engine according to a first embodiment of the present invention is applied. In FIG. 1, a crank angle sensor 25 for detecting a rotational angle of the engine 1, and generating an electric signal (hereinafter referred to as inter-pulse period AT) corresponding to the rotational angle is mounted to a crankshaft of the engine 1. Moreover, an intake pipe 2 for forming an intake passage and an exhaust pipe 26 for forming an exhaust passage are respectively connected to an intake port and exhaust port of a combustion chamber of the engine 1.

An air cleaner 3 for cleaning the outside air taken from the outside is installed on the most upstream side of the intake pipe 2. An airflow sensor (hereinafter referred to as AFS) 4 for detecting an intake air flow rate, and generating an electric signal (hereinafter referred to as intake air amount Qa) corresponding to the intake air flow rate, and an intake air temperature sensor 5 for detecting an intake air temperature in the intake passage, and generating an electric signal (hereinafter referred to as intake air temperature Ta) corresponding to the intake air temperature are provided on a downstream side (side closer to the engine 1) of the air cleaner 3. The AFS 4 and the intake air temperature sensor 5 may be provided integrally or independently. It should be noted that in FIG. 1, an example in which both the sensors 4 and 5 are integrally constructed is illustrated.

An electronically controlled throttle valve 6 for adjusting an air amount fed to the engine 1 is installed on a downstream side of the AFS 4. A throttle opening degree sensor 7 for detecting a throttle opening degree of the throttle valve 6, and generating an electric signal (hereinafter referred to as throttle opening degree Th) corresponding to the throttle opening degree is connected to the throttle valve 6. Further, a throttle valve drive unit (throttle actuator) (not shown) for operating the opening degree of the throttle valve 6 based on a throttle valve target opening degree described later, to thereby adjust the intake air amount taken into the engine 1 is provided to the throttle valve 6. Moreover, a supercharger 11 is provided to a downstream side of the throttle valve 6. The supercharger 11 includes a compressor (not shown) inside. The compressor is driven via a belt by an output shaft of the engine 1. On the downstream side of the throttle valve 6 and the upstream side of the supercharger 11, a throttle downstream pressure sensor 8 for detecting an air pressure at this location, and generating an electric signal (hereinafter referred to as throttle downstream pressure Pb1) corresponding to the air pressure, and a throttle downstream temperature sensor 9 for detecting an intake air temperature at this location, and generating an electric signal (hereinafter referred to as throttle downstream temperature Tb1) corresponding to the intake air temperature are integrally or independently provided. It should be noted that in FIG. 1, an example in which both the sensors 8 and 9 are integrally constructed is illustrated.

Moreover, a branch point to a bypass passage 10 for bypassing the supercharger 11 is provided downstream of the throttle downstream pressure sensor 8 and upstream of the supercharger 11. A bypass valve 12 for adjusting a passing air amount by changing a flow passage cross-sectional area of the bypass passage is provided in the bypass passage 10. A bypass valve opening degree sensor 13 for detecting a bypass valve opening degree of the bypass valve 12, and generating an electric signal (hereinafter referred to as bypass valve opening degree BV) corresponding to the bypass valve opening degree is connected to the bypass valve 12. The bypass passage 10 downstream of the bypass valve 12 is again connected to the intake pipe 2 on the downstream side of the supercharger 11. It should be noted that in FIG. 1, bypass valve driving means (bypass valve actuator) (not shown) for operating the opening degree of the bypass valve 12, to thereby change the flow passage cross-sectional area of the bypass passage 10 is provided for the bypass valve 12.

An intercooler (hereinafter also referred to as I/C) 14 is provided to a downstream side of this reconnection point of the bypass passage 10. The intercooler 14 cools the air compressed by the compressor provided to the supercharger 11. A surge tank 15 for suppressing an intake air pulsation is provided to the downstream side of the intercooler 14. An intake manifold pressure sensor 16 for detecting an air pressure in the surge tank 15, and generating an electric signal (hereinafter referred to as intake manifold pressure Pb) corresponding to the air pressure, and an intake manifold temperature sensor 17 for detecting an intake air temperature in the surge tank 15, and generating an electric signal (hereinafter referred to as intake manifold temperature Tb) corresponding to the intake air temperature are integrally or independently provided to the surge tank 15. It should be noted that in FIG. 1, an example in which both the sensors 16 and 17 are integrally constructed is illustrated. An injector 20 for injecting a fuel is provided to the intake port of the combustion chamber of the engine 1 downstream of the surge tank 15. It should be noted that the injector 20 may be provided so as to directly inject the fuel into the cylinder 18.

An ignition plug 21 for igniting a combustible mixture generated by mixing the air taken into the engine 1 and the fuel injected from the injector 20 with each other, and an ignition coil 22 for generating energy for generating a spark at the ignition plug 21 are disposed at a top portion of the cylinder 18. Moreover, an intake valve 23 for adjusting an air amount introduced from the intake pipe 2 into the cylinder 18 is disposed between the intake pipe 2 and the engine 1. Moreover, an exhaust valve 24 for adjusting an air amount exhausted from the cylinder 18 into the exhaust pipe 26 is disposed between the exhaust pipe 26 and the engine 1. Also, mechanisms capable of adjusting a valve timing and a valve lift amount may be provided for each of the intake valve 23 and the exhaust valve 24.

An exhaust gas purification catalyst 28 for purifying the exhaust gas is provided to a downstream side of the exhaust pipe 26 of the engine 1. On an upstream side (engine 1 side) of the exhaust gas purification catalyst 28, an air-to-fuel ratio sensor 27 for detecting a ratio (hereinafter referred to as air-to-fuel ratio) of the oxygen or the fuel in the combusted gas, and generating an electric signal (hereinafter referred to as air-to-fuel ratio AF) corresponding to the air-to-fuel ratio is provided.

Figure 2:
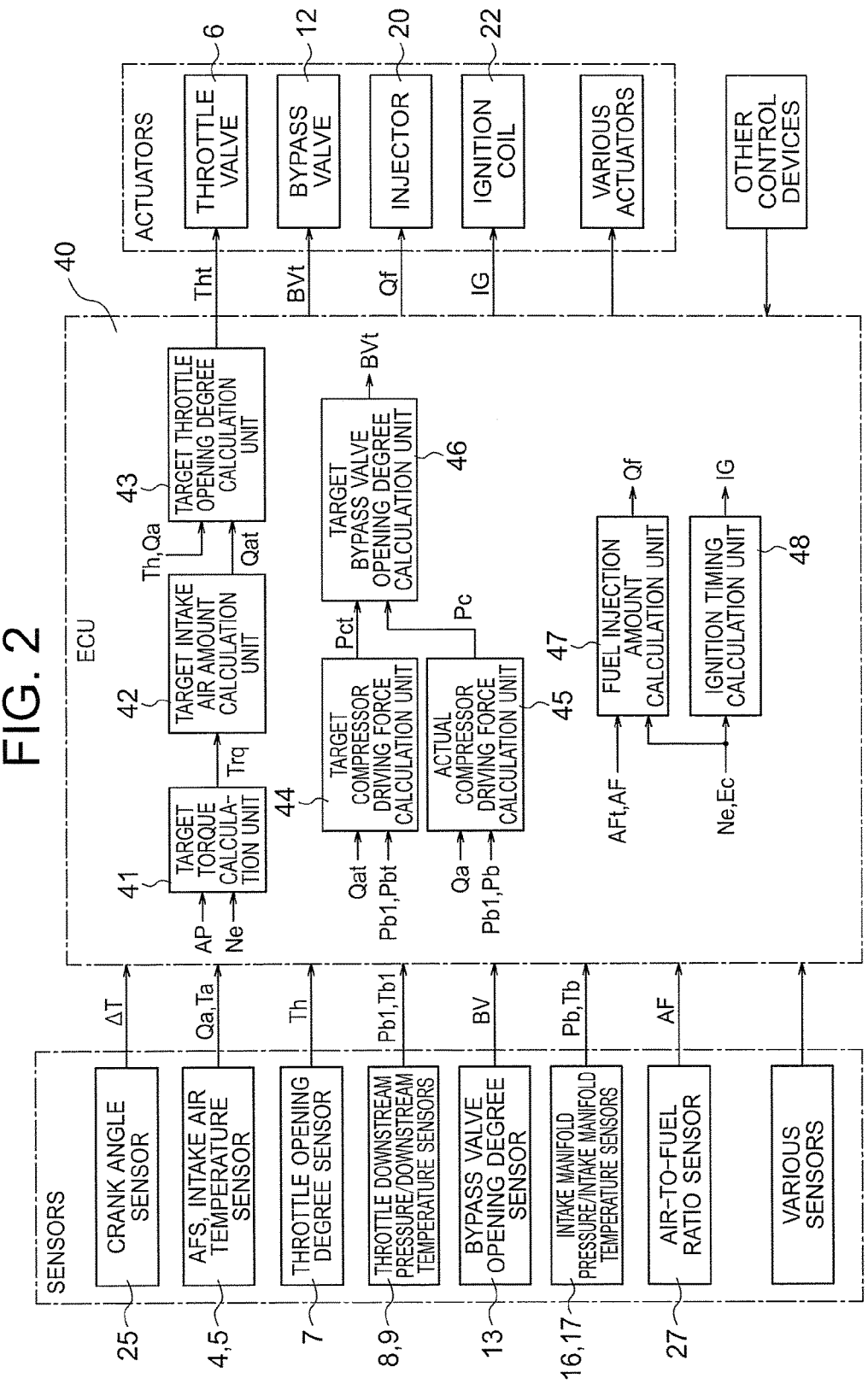
FIG. 2 is a block diagram for illustrating an overview of inputs/outputs and engine control of an ECU according to the embodiment of the present invention.

Referring to FIG. 2, a description is now given of the control device for an internal combustion engine according to the first embodiment of the present invention. FIG. 2 is a block diagram for illustrating a configuration and inputs/outputs of an electronic control unit (hereinafter referred to as ECU) 40 provided for the control device for an internal combustion engine according to the first embodiment of the present invention. The ECU 40 is composed of a microprocessor, and an interface circuit for carrying out inputs/outputs to/from the microprocessor. The microprocessor includes a CPU for carrying out calculation processing, a ROM for storing programs executed by the CPU and fixed-value data, and a RAM on which data is rewritable. As illustrated in FIG. 2, the electric signals are input from the respective sensors to the ECU 40. Namely, in the concrete, the inter-pulse period AT output in correspondence to the rotational angle of the engine measured by the crank angle sensor 25, the intake air amount Qa measured by the AFS 4, the intake air temperature Ta measured by the intake air temperature sensor 5, the throttle opening degree Th of the throttle valve 6 measured by the throttle opening degree sensor 7, the throttle downstream pressure Pb1 measured by the throttle downstream pressure sensor 8, the throttle downstream temperature Tb1 measured by the throttle downstream temperature sensor 9, the bypass valve opening degree BV measured by the bypass valve opening degree sensor 13, the intake manifold pressure Pb measured by the intake manifold pressure sensor 16, the intake manifold temperature Tb measured by the intake manifold temperature sensor 17, and the air-to-fuel ratio AF measured by the air-to-fuel ratio sensor 27 are input to the ECU 40.

Moreover, electric signals are also input to the ECU 40 from various sensors (not shown), which are other than the sensors described above. Examples of the various sensors (not shown) include an accelerator opening degree sensor for generating an electric signal corresponding to an accelerator opening degree AP, an atmospheric pressure sensor for measuring an atmospheric pressure Pa, and sensors (such as a vehicle speed sensor, a water temperature sensor, and a knock sensor) for controlling combustion of the engine 1 and controlling behaviors of the vehicle. Further, electric signals are also input from other control devices such as those for transmission control, brake control, traction control, and auto cruise control.

As illustrated in FIG. 2, the ECU 40 includes a target torque calculation unit 41, a target intake air amount calculation unit 42, a target throttle opening degree calculation unit 43, a target compressor driving force calculation unit 44, an actual compressor driving force calculation unit 45, a target bypass valve opening degree calculation unit 46, a fuel injection amount calculation unit 47, and an ignition timing calculation unit 48.

First, in the target torque calculation unit 41 of the ECU 40, a target torque Trq to be a target value of an engine output is calculated based on various data including the accelerator opening degree AP and an engine rotational speed Ne calculated from the inter-edge period AT. As to the target torque Trq, in the case where a required torque from another control device exists, the required torque is preferentially employed.

Then, in the target intake air amount calculation unit 42, in order to achieve the target torque Trq, a target charging efficiency Ect and a target intake air amount Qat are calculated based on the target torque Trq.

Then, in the target throttle opening calculation unit 43, in order to achieve the target intake air amount Qat, a target throttle opening degree Tht is calculated based on the target intake air amount Qat. In this way, the throttle valve 6 is driven based on the target throttle opening degree Tht. On this occasion, in the target throttle opening degree calculation unit 43, feedback correction control may also be carried out so that the throttle opening degree Th reaches the target throttle opening degree Tht, and further, feedback correction control may be applied to the target throttle opening degree Tht so that the intake air amount Qa reaches the target intake air amount Qat. In this way, so-called torque-based control for controlling the intake air amount and the like is carried out in order to attain the target torque in the engine.

Moreover, in the target compressor driving force calculation unit 44, a target compressor driving force Pct is calculated based on the target intake air amount Qat, a throttle downstream pressure Pb1, and a target intake manifold pressure Pbt calculated from the target charging efficiency Ect.

Moreover, in the actual compressor driving force calculation unit 45, an actual compressor driving force Pc is calculated based on the intake air amount Qa, the throttle downstream pressure Pb1, and the intake manifold pressure Pb.

Then, in the target bypass valve opening degree calculation unit 46, a target bypass valve opening degree BVt is calculated based on the target compressor driving force Pct and the actual compressor driving force Pc. In this way, the bypass valve 12 is driven based on the target bypass valve opening degree BVt. On this occasion, in the target bypass valve opening degree calculation unit 46, feedback correction control is also carried out so that the bypass valve opening degree BV reaches the target bypass valve opening degree BVt.

Further, in the ECU 40, the charging efficiency Ec is calculated based on the intake air amount Qa or the intake manifold pressure Pb. On the occasion, the intake air amount Qa and the intake manifold pressure Pb change due to influence of an intake air pulsation caused by an operation of the intake valve 23 and the like at a predetermined crank angle cycle. Therefore, in order to reduce the influence of the intake air pulsation, A/D conversion is applied to the intake air amount Qa and the intake manifold pressure Pb for each 1 millisecond which is shorter than this cycle, and averaging the converted digital values over each predetermined crank angle cycle, for example, over each 180 degCA for a four-cylinder engine or over each 240 degCA for a three-cylinder engine.

Then, in the fuel injection amount calculation unit 47 of the ECU 40, a fuel injection amount Qf is calculated based on the engine rotational speed Ne, the charging efficiency Ec and the target air-to-fuel ratio AFt which is set so that the exhaust gas, the engine output, and the like are optimal. In this way, the injector is controlled based on the fuel injection amount Qf.

Simultaneously, in the fuel injection amount calculation unit 47, the feedback correction control is also carried out for the fuel injection amount Qf so that the air-to-fuel ratio AF approaches the target air-to-fuel ratio AFt.

Further, in the ignition timing calculation unit 48, an ignition timing IG to be set while considering the fuel consumption and abnormal combustion is calculated based on the engine rotational speed Ne and the charging efficiency Ec. In this way, a current is supplied to the ignition coil 22 so as to attain the ignition timing IG.

Moreover, the ECU 40 also includes a function of estimating an actual torque generated by the engine 1 based on the engine rotational speed Ne, the charging efficiency Ec, the ignition timing IG, and the like, and a function of controlling other various types of actuators depending on necessity.

As described above, the engine 1 is controlled by the ECU 40. Then, referring to FIG. 3 to FIGS. 7A and 7B, a detailed description is now given of the target compressor driving force calculation unit 44, the actual compressor driving force calculation unit 45, and the target bypass valve opening degree calculation unit 46 according to the first embodiment of the present invention.

Figure 3:
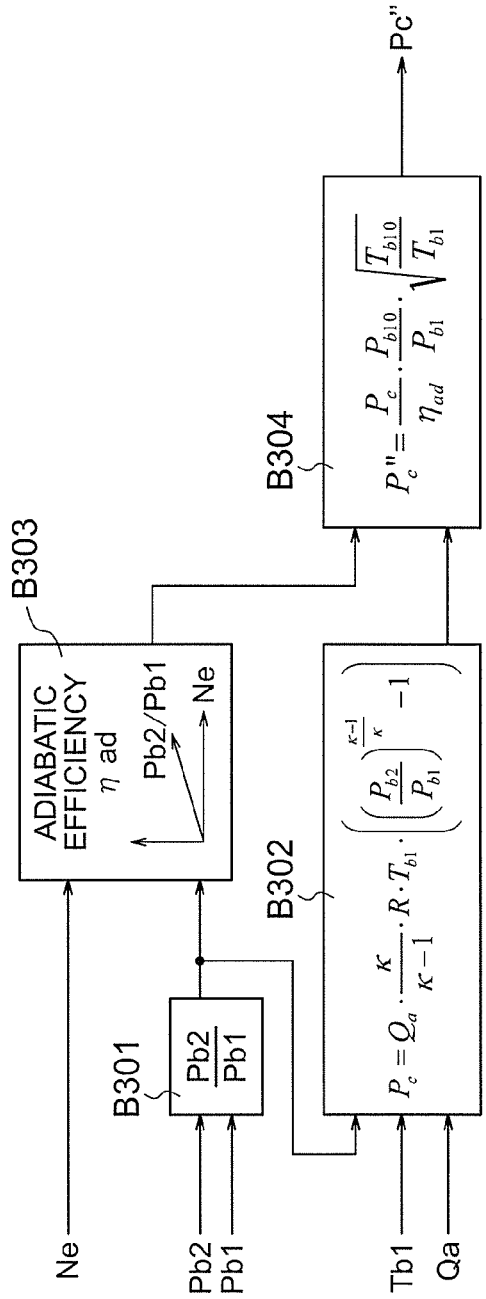
FIG. 3 is a control block diagram for illustrating contents of calculation processing for a compressor driving force according to the embodiment of the present invention.

FIG. 3 is a control block diagram for specifically illustrating a configuration of calculation processing for the compressor driving force in the target compressor driving force calculation unit 44 and the actual compressor driving force calculation unit 45. Referring to FIG. 3 as well as FIG. 1 and FIG. 2, a specific description is now given of the calculation processing for the target compressor driving force and the actual compressor driving force according to this embodiment.

First, a description is given of the compressor driving force. A power (hereinafter referred to as compressor driving force) Pc [W] calculated based on adiabatic compression work and required for driving the compressor is calculated by Equation (1). In Equation (1), K is a specific heat ratio (1.4 for the air), Qcmp is a compressor passage flow rate [g/s], R is a gas constant [kJ/(kg·K)] (0.287 for the air), P is a pressure [kPa], and T is an absolute temperature [K]. It should be noted that suffixes 1 and 2 for P: pressure [kPa] and T: absolute temperature [K] respectively represent 1: compressor inlet and 2: compressor outlet.

$$P_c = Q_{cmp} \cdot \frac{\kappa}{\kappa - 1} \cdot R \cdot T_1 \cdot \left( \left( \frac{P_2}{P_1} \right)^{\frac{\kappa-1}{\kappa}} - 1 \right) \tag{1}$$

Figure 4:
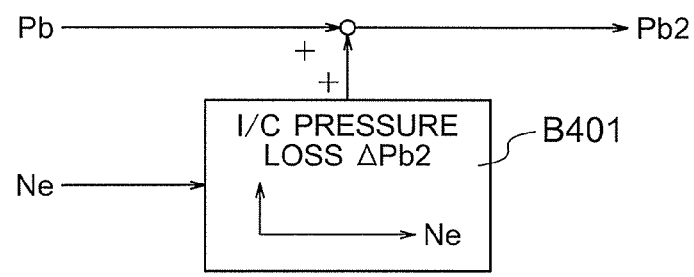
FIG. 4 is a control block diagram for illustrating contents of calculation processing for a supercharger downstream pressure according to the embodiment of the present invention.
Figure 5:
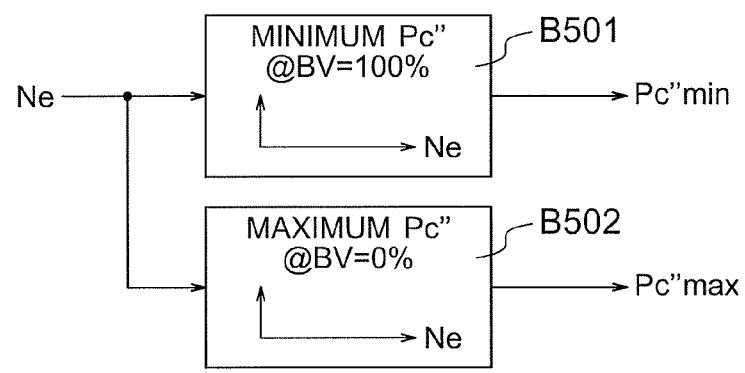
FIG. 5 is a control block diagram for illustrating contents of calculation processing for maximum and minimum compressor driving forces according to the embodiment of the present invention.

In this embodiment, the compressor passage flow rate Qcmp in Equation (1) and the intake air flow rate Qa are equal to each other. Moreover, the compressor inlet pressure P1, namely, a supercharger upstream pressure, is a throttle downstream pressure Pb1 (hereinafter also referred to as supercharger upstream pressure Pb1). Moreover, the compressor inlet temperature T1, namely, a supercharger upstream temperature, is a throttle downstream temperature Tb1 (hereinafter also referred to as supercharger upstream temperature Tb1). The compressor outlet pressure P2, namely, the supercharger downstream pressure, is approximately equal to the intake manifold pressure Pb, but in a strict sense, an offset set due to a pressure loss of the intercooler 14 exists. Therefore, for example, as illustrated in FIG. 4, a lookup table (map) in which a relationship between the value of the engine rotational speed Ne and the value of the I/C pressure loss ΔPb2 are defined in advance (hereinafter this map is referred to as "I/C pressure loss ΔPb2 map") is stored in advance in Block B401. Then, the I/C pressure loss ΔPb2 is calculated by using the engine rotational speed Ne according to the "I/C pressure loss ΔPb2 map". The supercharger downstream pressure Pb2 is acquired by using an adder to add the calculated I/C pressure loss ΔPb2 to the intake manifold pressure Pb. Equation (1) can be rewritten as Equation (2) by using the supercharger upstream pressure Pb1, the supercharger upstream temperature Tb1, and the supercharger downstream pressure Pb2, which are acquired in this way.

$$P_c = Q_a \cdot \frac{\kappa}{\kappa - 1} \cdot R \cdot T_{b1} \cdot \left( \left( \frac{P_{b2}}{P_{b1}} \right)^{\frac{\kappa-1}{\kappa}} - 1 \right) \tag{2}$$

Figure 7A:
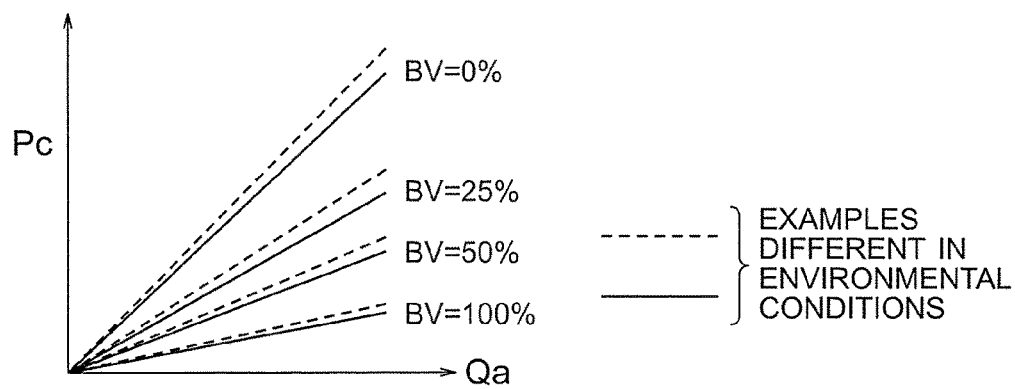
FIG. 7A and FIG. 7B are graphs for showing a relationship between Qa and Pc and a relationship between Qa and Pc", respectively, according to the embodiment of the present invention.

Incidentally, in the supercharger 11 disposed downstream of the throttle as in this embodiment, the supercharger upstream pressure Pb1 always changes. Moreover, the supercharger upstream pressure Pb1 and the supercharger upstream temperature Tb1 greatly change also depending on an environmental state. In the case where the supercharger upstream pressure Pb1 and the supercharger upstream temperature Tb1 change, if the compressor driving force Pc is calculated based on Equation (2) at a certain engine rotational speed, a change amount and a variation thereof of the compressor driving force Pc are large with respect to the intake air amount Qa. Therefore, such compressor driving force Pc is thus difficult to be treated in terms of the control (For example, see FIG. 7A. As shown in FIG. 7A, as the intake air amount Qa increases, the compressor driving force Pc increases, and an increase rate (gradient of the chart) thereof is different for each of the engine rotational speed Ne and the bypass valve opening degree BV.). Therefore, in order to convert the compressor driving force Pc into that in the standard state (such as Pb10=101.3 [kPa] and Tb10=25° C., suffix 0 represents the standard state), the compressor driving force Pc is corrected into a corrected compressor driving force Pc' by using Equation (3) derived from a similarity law considering influence of a compression property.

$$P'_c = P_c \cdot \frac{P_{b10}}{P_{b1}} \cdot \sqrt{\frac{T_{b10}}{T_{b1}}} \tag{3}$$

Further, the corrected compressor driving force Pc' is calculated while assuming an adiabatic process. However, the process of the actual compressor is not an isoentropic process, but is an irreversible change in an adiabatic system, and the entropy thus increases. An index representing a difference between the actual process and the isoentropic process is an adiabatic efficiency ηad, which is defined by Equation (4).

$$\eta_{ad} = \frac{(P_{b2}/P_{b1})^{\frac{\kappa-1}{\kappa}} - 1}{(T_{b2}/T_{b1}) - 1} \tag{4}$$

Here, Tb2 is a supercharger downstream temperature. In this embodiment, a temperature sensor is installed downstream of the supercharger only when the adiabatic efficiency read is measured. Then, the supercharger downstream temperature Tb2 is measured thereby while the engine rotational speed Ne and the bypass valve opening degree BV are being changed. Moreover, the adiabatic efficiency read is calculated based on the measured supercharger downstream temperature Tb2. The calculated adiabatic efficiency read is stored in advance in a three-dimensional lookup table (map) having the engine rotational speed Ne and a pressure ratio (Pb2/Pb1) of the supercharger downstream/upstream pressures as axes (hereinafter this map is referred to as "adiabatic efficiency read map"). The pressure ratio (Pb2/Pb1) of the supercharger downstream/upstream pressures changes in correspondence to the bypass valve opening degree BV. Thus, the adiabatic efficiency of the supercharger 11 can be calculated thereby. It should be noted that in this embodiment, a decrease in the efficiency due to the opening of the bypass valve 12 and an increase in the temperature due to the circulation of the compressed air are considered to be included in the adiabatic efficiency. When the corrected compressor driving force Pc' is thus corrected while considering the adiabatic efficiency pad, Equation (5) can be obtained.

$$P_c'' = \frac{P_c'}{\eta_{ad}} \quad (5)$$

The corrected compressor driving force after the adiabatic efficiency correction represented by Equation (5) is hereinafter referred to as post-correction compressor driving force Pc''. The post-correction compressor driving force Pc'' is calculated from the compressor driving force Pc by using Equation (6) derived from Equation (3) and Equation (5).

$$P_c'' = \frac{P_c}{\eta_{ad}} \cdot \frac{P_{b10}}{P_{b1}} \cdot \sqrt{\frac{T_{b10}}{T_{b1}}} \quad (6)$$

Figure 7B:
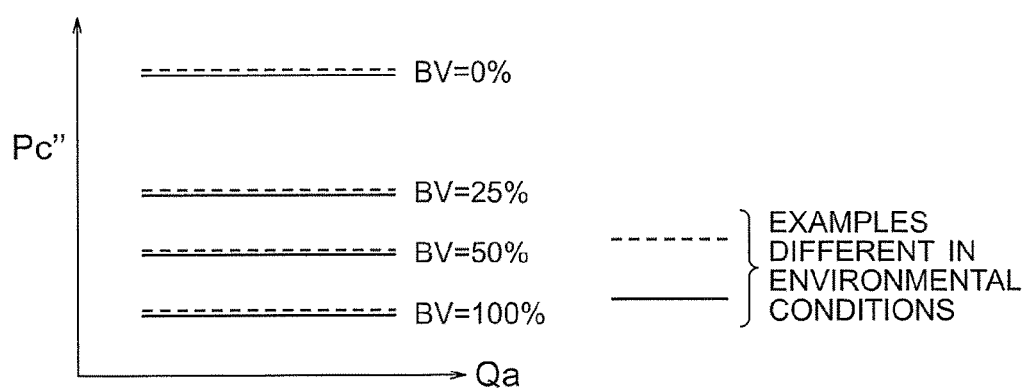

When the post-correction compressor driving force Pc'' calculated in this way is used, as shown in FIG. 7B, for example, at an arbitrary engine rotational speed, the post-correction compressor driving force Pc'' relative to the intake air amount Qa is constant for each bypass valve opening degree BV. Thus, the bypass valve opening degree BV and the post-correction compressor driving force Pc'' correspond to each other, independently of the environmental conditions and the intake air amount Qa. This embodiment is configured based on this correspondence relation.

Then, referring to a control block diagram of FIG. 3 for specifically illustrating contents of the calculation processing for the compressor driving force, a description is given of a method of actually realizing the calculation of the compressor driving force described above on the ECU 40. First, a description is given of the calculation of the actual compressor driving force in the actual compressor driving force calculation unit 45. First, as illustrated in FIG. 3, in Block B301, the ratio (Pb2/Pb1) of the supercharger downstream pressure to the supercharger upstream pressure is calculated based on the supercharger upstream pressure Pb1 and the supercharger downstream pressure Pb2. On this occasion, the supercharger downstream pressure Pb2 is calculated by adding the I/C pressure loss ΔPb2 to the intake manifold pressure Pb as described above referring to the block diagram of FIG. 4.

In a subsequent Block B302, the actual compressor driving force Pc is calculated from the ratio (Pb2/PB1) of the supercharger downstream pressure to the supercharger upstream pressure, the supercharger upstream temperature Tb1, and the intake air flow rate Qa based on Equation (2). On this occasion, an exponential calculation in the parentheses in Equation (2) is high in the calculation amount for the ECU 40. Thus, a calculation result acquired by raising each pressure ratio (Pb2/Pb1) of the supercharger upstream pressure to the supercharger downstream pressure by a ((κ−1)/κ)-th power may be set in advance as a lookup table (map), and the exponential calculation result may be obtained from this table based on the pressure ratio (Pb2/Pb1) of the supercharger upstream pressure to the supercharger downstream pressure.

Then, in Block B303, the adiabatic efficiency read is calculated. As described above, the adiabatic efficiency read calculated in advance based on the measured result is stored as the "adiabatic efficiency ηad map", and is calculated from the "adiabatic efficiency ηad map" based on the engine rotational speed Ne and the pressure ratio (Pb2/Pb1) of the supercharger downstream pressure to the supercharger upstream pressure.

In a subsequent Block B304, the post-correction compressor driving force Pc'' is calculated from the actual compressor driving force Pc, the adiabatic efficiency pad, and the like based on Equation (6). With this configuration, in the ECU 40, the actual compressor driving force can be calculated by the actual compressor driving force calculation unit 45.

A description is now given of the calculation of the target compressor driving force by the target compressor driving force calculation unit 44. The calculation of the target compressor driving force is basically the same as the calculation of the actual compressor driving force described above. It should be noted that the calculation of the target compressor driving force can be realized by changing the intake air flow amount Qa to the target intake air flow amount Qat, and changing the supercharger downstream pressure Pb2 to the target supercharger downstream pressure Pb2t in the calculation of the actual compressor driving force. On this occasion, the target supercharger downstream pressure Pb2t is calculated by using the configuration of the block diagram of FIG. 4, namely, by adding the I/C pressure loss ΔPb2 to the target intake manifold pressure Pbt calculated based on the target charging efficiency Ect. Moreover, in order to suppress an abrupt change in the supercharger upstream pressure Pb1 when the target compressor driving force is calculated, the supercharger upstream pressure Pb1 may be changed to a supercharger upstream pressure Pb1f after filtering. Through use of those values, a target compressor driving force Pct and a post-correction target compressor driving force Pct'' can be calculated by carrying out the calculation from Block B301 to Block B304 as described above.

It should be noted that as the method of calculating the target intake manifold pressure Pbt from the target charging efficiency Ect, a volumetric efficiency Kv with respect to the intake manifold as a reference, which represents a ratio of a fresh air volume taken from the intake manifold by the cylinder 18 during the intake stroke to the exhaust amount of the cylinder 18, may be stored in advance as a three-dimensional lookup table (map) of the engine rotational speed Ne and the intake manifold pressure Pb, and based on Equation (7), calculation may be repeated until the target intake manifold pressure Pbt converges. On this occasion, a suffix 0 represents the standard state, and for example, a standard atmospheric pressure Pa0=101.3 [kPa] and a standard outside temperature Ta0=25° C.

$$P_{bt} = \frac{Ect}{Kv(Ne, P_{bt})} \cdot \frac{T_b}{T_{a0}} \cdot P_{a0} \quad (7)$$

Figure 6:
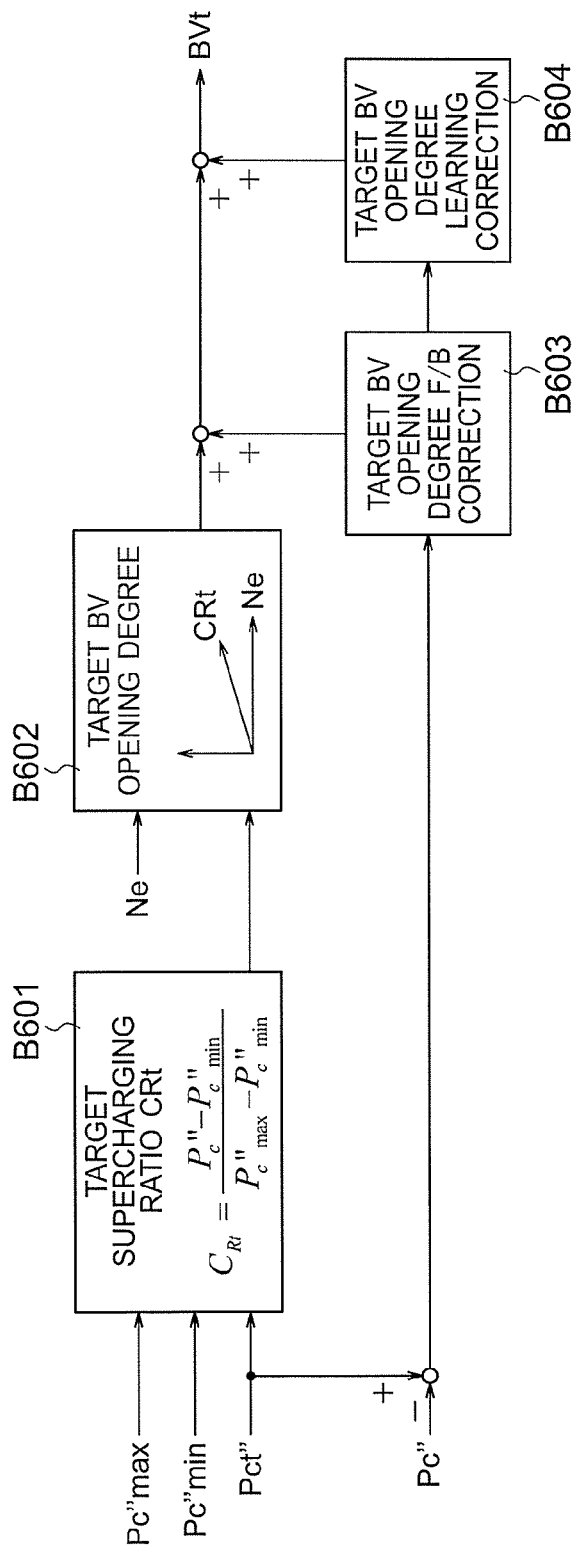
FIG. 6 is a control block diagram for illustrating contents of calculation processing for a target bypass valve opening degree according to the embodiment of the present invention.

FIG. 6 is a control block diagram for specifically illustrating contents of the processing of calculating the target bypass valve opening degree. Referring to FIG. 6 as well as FIG. 1 and FIG. 2, a specific description is now given of processing of calculating the target bypass valve opening degree by the target bypass valve opening degree calculation unit 46 according to the first embodiment of the present invention.

First, a description is given of a supercharging ratio used to calculate the target bypass valve opening degree. As described above referring to FIG. 7B, the bypass valve opening degree BV and the post-correction compressor driving force Pc" correspond to each other, but when the engine rotational speed Ne changes, the range of values taken by the post-correction compressor driving force Pc" significantly changes in this relationship. Therefore, in order to calculate the target bypass valve opening degree BVt from the post-correction target compressor driving force Pc" based on the relationship between the bypass valve opening degree BV and the post-correction compressor driving force Pc", the engine rotational speed Ne needs to be considered, resulting in complex calculation.

To address this problem, by using such a fact that the post-correction compressor driving force Pc" is maximum when the bypass valve opening degree BV is fully closed (0%), and the post-correction compressor driving force Pc" is minimum when the bypass valve opening degree BV is fully opened (100%), the supercharging ratio CR represented by Equation (8) is defined as an index for indicating where the post-correction compressor driving force Pc" exists between the minimum post-correction compressor driving force Pc"min and the maximum post-correction compressor driving force Pc"max. In other words, the supercharging ratio CR is represented by a ratio of "a difference between the post-correction compressor driving force Pc" and the minimum post-correction compressor driving force Pc"min" to "a difference between the maximum post-correction compressor driving force Pc"max and the minimum post-correction compressor driving force Pc"min". The supercharging ratio calculated in this way is a value normalized by the maximum post-correction compressor driving force and the minimum post-correction compressor driving force for each engine rotational speed. Thus, the supercharging ratio takes a value between 0% to 100% independently of the engine rotational speed, no longer requires the consideration of the engine rotational speed, and is thus easy to be used for control.

$$C_R = \frac{P_c'' - P_{c\,min}''}{P_{c\,max}'' - P_{c\,min}''} \quad (8)$$

More specifically, the relationship between the bypass valve opening degree BV and the post-correction compressor driving force Pc" is measured for each engine rotational speed Ne, and the minimum post-correction compressor driving force Pc"min and the maximum post-correction compressor driving force Pc"max are acquired for each engine rotational speed Ne. Then, a lookup table (map) (hereinafter referred to as "supercharging ratio map") of the supercharging ratio CR having the engine rotational speed Ne and the bypass valve opening degree BV as axes can be generated based on those values. Further, this map may be converted in terms of the axis into a map of the bypass valve opening degree BV having the engine rotational speed Ne and the supercharging ratio CR as axes. When the map after the axis conversion (hereinafter referred to as "relationship map of the bypass valve opening degree BV with respect to the engine rotational speed and the supercharging ratio CR" or simply referred to as "bypass valve opening degree map") is used, the target bypass valve opening degree BVt can be easily calculated from the engine rotational speed Ne and the target supercharging ratio CRt.

Referring to a control block diagram of FIG. 6 for specifically illustrating contents of the calculation processing for the target bypass valve opening degree, a description is now given of a method of actually realizing the calculation of the target bypass valve opening degree by using the supercharging ratio described above on the ECU 40. In Block B601, the target supercharging ratio CRt is calculated based on Equation (8) from the minimum post-correction compressor driving force Pc"min, the maximum post-correction compressor driving force Pc"max, and the post-correction target compressor driving force Pct". Here, it is only necessary that, as illustrated in Blocks B501 and B502 of FIG. 5, the minimum post-correction compressor driving force Pc" min and the maximum post-correction compressor driving force Pc"max be calculated as follows. First, the minimum post-correction compressor driving force and the maximum post-correction compressor driving force are measured in advance for each engine rotational speed Ne. Then, the relationship between the engine rotational speed Ne, and the minimum post-correction compressor driving force and the maximum post-correction compressor driving force are respectively set in advance to lookup tables (maps) (those maps are hereinafter referred to as "minimum post-correction compressor driving force Pc"min" and "maximum post-correction compressor driving force Pc"max"). Then, the minimum post-correction compressor driving force and the maximum post-correction compressor driving force are calculated from those lookup table based on the engine rotational speed Ne.

Then, in Block B602, by using the bypass valve opening degree map storing the relationship of the bypass valve opening degree BV to the engine rotational speed and the supercharging ratio CR in advance, the target bypass valve opening degree BVt is calculated from the engine rotational speed Ne and the target supercharging ratio CRt. In the target bypass valve opening degree calculation unit 46, the feedback correction control is carried out so that the bypass valve opening degree BV reaches the target bypass valve opening degree BVt. However, there is a case where the post-correction target compressor driving force Pct" and the post-correction compressor driving force Pc" may not match each other due to variations in the supercharger and the like. Thus, in Block B603, feedback (F/B) correction control for the target bypass valve opening degree is carried out so that the post-correction target compressor driving force Pct" and the post-correction compressor driving force Pc" match each other. More specifically, the feedback control, which is PID control, is carried out, and based on a difference between the post-correction target compressor driving force Pct" and the post-correction compressor driving force Pc", feedback correction amounts FB(P), FB(I), and FB(D) for the target bypass valve opening degree are calculated. Then, those correction amounts are added to the target bypass valve opening degree BVt. Here, FB(P) is a proportional term, FB(I) is an integral term, and FB(D) is a derivative term. In this way, Block B603 comprises a feedback correction amount calculation unit for calculating a feedback correction amount for the target bypass valve opening degree based on the difference between the actual compressor driving force and the target compressor driving force.

Further, in Block B604, an amount of the value of the integral term. FB(I) of the feedback correction amount for the target bypass valve opening degree exceeding a threshold set in advance is calculated, as a learning correction amount LRN for the bypass valve opening degree. The learning correction amount LRN is a value for reducing influence on variation elements caused by individual differences, secular changes, and the like of the supercharger and the bypass valve. Then, the learning correction amount LRN is added to the target bypass valve opening degree BVt. Here, the learning correction amount LRN may be a single value, however, for more precise learning, for example, zones may be generated depending on the engine rotational speed and the target supercharging ratio, and the learning value may be set for each of the zones. In this way, Block B604 comprises a feedback learning amount calculation unit for calculating the feedback learning amount for the quantitative deviation amount of the feedback correction amount for the target bypass valve opening degree, and adding the feedback leaning amount to the target bypass valve opening degree, to thereby correct the target bypass valve opening degree.

In this way, the bypass valve opening degree BV can be controlled based on the post-correction target compressor driving force Pct". It should be noted that the example in which the feedback correction control and the learning correction are applied to the target bypass valve opening degree BVt is described above, but the post-correction target compressor driving force Pct" can be attained in the same way by applying the feedback correction control and the leaning correction to other values such as the target supercharging ratio CRt.

As described above, the control device for an internal combustion engine according to the first embodiment of the present invention controls the bypass valve opening degree by: calculating, in the target torque calculation unit 41, the target torque based on the accelerator operation by the driver or the required torque value from other control devices; calculating, in the target intake air amount calculation unit 42, the target charging efficiency and the target intake air amount for attaining the target torque; controlling, in the target throttle opening degree calculation unit 43, the target throttle opening degree by calculating the target throttle opening degree so as to attain the target intake air flow rate; and calculating, in the target bypass valve opening degree calculation unit 46, the target bypass valve opening degree so as to attain the target intake manifold pressure and the target intake air amount based on the target charging efficiency. As a result, the torque requirement from the driver and other control devices can be realized, and manipulation of an acceleration response characteristic and the like can be easily realized.

Moreover, the control device for an internal combustion engine according to the first embodiment of the present invention controls the bypass valve opening degree BV based on the target supercharging ratio CRt calculated from the post-correction target compressor driving force Pct", and applies the learning correction to the target bypass valve opening degree BVt. In other words, the relationship between the post-correction target compressor driving force Pct" relating to the variation in the supercharger and the target bypass valve opening degree BVt relating to the variation in the bypass valve is corrected by learning. Therefore, the variation elements including both the variations of the supercharger and the bypass valve can thus be learned.

The control maps used in the control device for an internal combustion engine according to the first embodiment of the present invention include the adiabatic efficiency ηad map, the I/C pressure loss ΔPb2 map, the minimum post-correction compressor driving force Pc"min map, the maximum post-correction compressor driving force Pc"max map, and the bypass valve opening degree map for setting the relationship of the bypass valve opening degree BV with respect to the engine rotational speed and the supercharging ratio CR. However, the I/C pressure loss ΔPb2 map can be set from a result of actually measuring the intercooler independently, and the other maps can be set from a result of actually measuring the supercharger independently, and can also be set from a result of actually measuring the intercooler and the supercharger installed on the engine. In this way, the maps can be generated from the independent characteristics of the intercooler and the supercharger, and hence when the intercooler and the supercharger are changed to those having different specifications, the characteristic map only for the changed part needs to be changed. Moreover, even when the intercooler or the supercharger is used for another engine, the control map values may be used therein. As a result, the data measurement and the adaptation man-hours can be suppressed.

As described above, the first embodiment of the present invention has such an excellent characteristic that, in the internal combustion engine equipped with a mechanical supercharger including a bypass valve, the acceleration response characteristic can be manipulated and the variation elements can be learned, and can further suppress the man-hours for the data measurement and the adaptation.

It should be noted that, for the target compressor driving force, the minimum compressor driving force, the maximum compressor driving force, and the actual compressor driving force, which are described above in the embodiment, a target compressor driving force, the minimum compressor driving force, the maximum compressor driving force, and an actual compressor driving force corrected by both of the correction method including the correction to the standard state based on the similarity law considering the influence of the compression property, and the correction by the adiabatic efficiency of the supercharger may be used. Alternatively, a target compressor driving force, the minimum compressor driving force, the maximum compressor driving force, and an actual compressor driving force corrected by any one of the correction method including the correction to the standard state based on the similarity law considering the influence of the compression property, and the correction by the adiabatic efficiency of the supercharger may be used.

What is claimed is:

1. A control device for an internal combustion engine, comprising:
    a throttle valve provided to an intake passage of an internal combustion engine;
    a supercharger provided to a downstream side of the throttle valve provided to the intake passage, the supercharger including a compressor to be driven by an output shaft of the internal combustion engine;
    a bypass valve provided to a bypass passage, the bypass passage being connected to the intake passage to bypass the supercharger;
    a bypass valve driver operating a bypass valve opening degree, which is an opening degree of the bypass valve, to thereby change a flow passage cross-sectional area of the bypass passage;
    a target intake air amount calculator calculating, based on a target torque to be an output target value of the internal combustion engine, a target intake air amount to be a target value of an intake air amount taken into the internal combustion engine, and a target charging efficiency to be a target value of a charging efficiency of the internal combustion engine;

a target throttle opening degree calculator calculating a target opening degree of the throttle valve based on the target intake air amount;

a throttle valve driver operating, based on the target opening degree of the throttle valve, the opening degree of the throttle valve, to thereby adjust an intake air amount to be an air amount taken into the internal combustion engine;

a target supercharger downstream pressure calculator calculating, based on the target charging efficiency, a target supercharger downstream pressure to be a target value of a pressure on a downstream side of the supercharger;

a supercharger upstream pressure detector detecting a supercharger upstream pressure to be a pressure on an upstream side of the supercharger;

a target compressor driving force calculator calculating, based on the target intake air amount, the target supercharger downstream pressure, and the supercharger upstream pressure, a target compressor driving force; and a target bypass valve opening degree calculator calculating, based on the target compressor driving force, a target bypass valve opening degree to be a target value of the bypass valve opening degree.

2. The control device for an internal combustion engine according to claim 1, wherein:

the target bypass valve opening degree calculator includes a compressor driving force map for setting in advance a relationship of a rotational speed of the internal combustion engine with a minimum compressor driving force and a maximum compressor driving force, and calculates the minimum compressor driving force and the maximum compressor driving force based on the rotational speed of the internal combustion engine by using the compressor driving force map;

the target bypass valve opening degree calculator calculates, based on the target compressor driving force, the minimum compressor driving force, and the maximum compressor driving force, a target supercharging ratio representing a position of the target compressor driving force between the minimum compressor driving force and the maximum compressor driving force; and the target bypass valve opening degree calculator includes a bypass valve opening degree map for setting in advance a relationship between the target supercharging ratio and the bypass valve opening degree, and calculates the target bypass valve opening degree based on the target supercharging ratio by using the bypass valve opening degree map.

3. The control device for an internal combustion engine according to claim 1, wherein the target supercharger downstream pressure calculator is configured to:

calculate a target intake manifold pressure based on a volumetric efficiency with respect to an intake manifold as a reference and the target charging efficiency, the volumetric efficiency is a ratio of a fresh air volume taken from the intake manifold by a cylinder of the internal combustion engine during an intake stroke to an exhaust amount of the cylinder; and calculate the target supercharger downstream pressure based on the target intake manifold pressure.

4. The control device for an internal combustion engine according to claim 2, wherein the target supercharger downstream pressure calculator is configured to:

calculate a target intake manifold pressure based on a volumetric efficiency with respect to an intake manifold as a reference and the target charging efficiency, the volumetric efficiency is a ratio of a fresh air volume taken from the intake manifold by a cylinder of the internal combustion engine during an intake stroke to an exhaust amount of the cylinder; and calculate the target supercharger downstream pressure based on the target intake manifold pressure.

5. The control device for an internal combustion engine according to claim 1, further comprising:

intake air amount detector for detecting the intake air amount;

an actual compressor driving force calculator calculating, based on the supercharger upstream pressure, the supercharger downstream pressure, and the intake air amount, an actual compressor driving force; and a feedback correction amount calculator calculating, based on a difference between the actual compressor driving force and the target compressor driving force, a feedback correction amount for the target bypass valve opening degree.

6. The control device for an internal combustion engine according to claim 2, further comprising:

an intake air amount detector detecting the intake air amount;

an actual compressor driving force calculator calculating, based on the supercharger upstream pressure, the supercharger downstream pressure, and the intake air amount, an actual compressor driving force; and a feedback correction amount calculator calculating, based on a difference between the actual compressor driving force and the target compressor driving force, a feedback correction amount for the target bypass valve opening degree.

7. The control device for an internal combustion engine according to claim 3, further comprising:

an intake air amount detector detecting the intake air amount;

an actual compressor driving force calculator for calculating, based on the supercharger upstream pressure, the supercharger downstream pressure, and the intake air amount, an actual compressor driving force; and a feedback correction amount calculator calculating, based on a difference between the actual compressor driving force and the target compressor driving force, a feedback correction amount for the target bypass valve opening degree.

8. The control device for an internal combustion engine according to claim 4, further comprising:

an intake air amount detector detecting the intake air amount;

an actual compressor driving force calculator calculating, based on the supercharger upstream pressure, the supercharger downstream pressure, and the intake air amount, an actual compressor driving force; and a feedback correction amount calculator calculating, based on a difference between the actual compressor driving force and the target compressor driving force, a feedback correction amount for the target bypass valve opening degree.

9. The control device for an internal combustion engine according to claim 5, further comprising a feedback learning amount calculator calculating a feedback learning amount for a quantitative deviation amount of the feedback correction amount for the target bypass valve opening degree, and adding the feedback learning amount to the target bypass valve opening degree, thereby correcting the target bypass valve opening degree.

10. The control device for an internal combustion engine according to claim 6, further comprising a feedback learning amount calculator calculating a feedback learning amount for a quantitative deviation amount of the feedback correction amount for the target bypass valve opening degree, and adding the feedback learning amount to the target bypass valve opening degree, thereby correcting the target bypass valve opening degree.

11. The control device for an internal combustion engine according to claim 7, further comprising a feedback learning amount calculator for calculating a feedback learning amount for a quantitative deviation amount of the feedback correction amount for the target bypass valve opening degree, and adding the feedback learning amount to the target bypass valve opening degree, thereby correcting the target bypass valve opening degree.

12. The control device for an internal combustion engine according to claim 8, further comprising a feedback learning amount calculator calculating a feedback learning amount for a quantitative deviation amount of the feedback correction amount for the target bypass valve opening degree, and adding the feedback learning amount to the target bypass valve opening degree, thereby correcting the target bypass valve opening degree.

13. The control device for an internal combustion engine according to claim 1, wherein the target compressor driving force comprises a target compressor driving force corrected by at least one of a correction to a standard state based on a similarity law considering influence of a compression property, and a correction by an adiabatic efficiency of the supercharger.

14. The control device for an internal combustion engine according to claim 2, wherein the minimum compressor driving force and the maximum compressor driving force comprise a minimum compressor driving force and a maximum compressor driving force that are corrected by at least one of a correction to a standard state based on a similarity law considering influence of a compression property, and a correction by an adiabatic efficiency of the supercharger.

15. The control device for an internal combustion engine according to claim 5, wherein the actual compressor driving force comprises an actual compressor driving force corrected by at least one of a correction to a standard state based on a similarity law considering influence of a compression property, and a correction by an adiabatic efficiency of the supercharger.

* * * * *